(12) United States Patent
Janssens et al.

(10) Patent No.: US 8,816,189 B2
(45) Date of Patent: Aug. 26, 2014

(54) INTEGRATED SOLAR MODULE

(75) Inventors: Steven Howard Janssens, San Francisco, CA (US); Paul J. Silberschatz, San Francisco, CA (US)

(73) Assignee: SunEdison, LLC, Beltsville, MD (US)

( * ) Notice: Subject to any disclaimer, the term of this patent is extended or adjusted under 35 U.S.C. 154(b) by 193 days.

(21) Appl. No.: 13/209,033

(22) Filed: Aug. 12, 2011

(65) Prior Publication Data
US 2013/0037087 A1  Feb. 14, 2013

(51) Int. Cl.
*H01L 31/042* (2014.01)
*H01L 31/00* (2006.01)

(52) U.S. Cl.
USPC ............................. 136/251; 136/259

(58) Field of Classification Search
CPC .................................... H01L 31/0424
USPC ................................. 136/251, 259
See application file for complete search history.

(56) References Cited

U.S. PATENT DOCUMENTS

| | | | |
|---|---|---|---|
| 4,838,951 A * | 6/1989 | Riermeier et al. | 136/251 |
| 6,784,360 B2 | 8/2004 | Nakajima et al. | |
| 7,012,188 B2 | 3/2006 | Erling | |
| 7,780,472 B2 | 8/2010 | Lenox | |
| 7,797,889 B2 | 9/2010 | McClintock et al. | |
| 2004/0045595 A1 * | 3/2004 | Makita et al. | 136/244 |
| 2006/0005875 A1 * | 1/2006 | Haberlein | 136/251 |
| 2009/0242014 A1 | 10/2009 | Leary | |
| 2010/0065108 A1 | 3/2010 | West et al. | |
| 2010/0131108 A1 | 5/2010 | Meyer | |
| 2010/0154784 A1 | 6/2010 | King et al. | |
| 2010/0219304 A1 | 9/2010 | Miros et al. | |
| 2010/0243034 A1 * | 9/2010 | Hu et al. | 136/251 |
| 2011/0024582 A1 | 2/2011 | Gies et al. | |
| 2011/0174947 A1 | 7/2011 | Wu | |

FOREIGN PATENT DOCUMENTS

| | | |
|---|---|---|
| DE | 3701293 A1 | 4/1988 |
| DE | 10225863 C1 | 10/2003 |
| DE | 102008012774 A1 | 12/2009 |
| DE | 202009012669 U1 | 2/2010 |
| EP | 1617485 A1 | 1/2006 |

OTHER PUBLICATIONS

International Search Report and Written Opinion of the International Searching Authority mailed on Aug. 16, 2013 regarding PCT/US2012/047538 filed on Jul. 20, 2012, 13 pages.

* cited by examiner

*Primary Examiner* — Jonathan Johnson
*Assistant Examiner* — Angelo Trivisonno
(74) *Attorney, Agent, or Firm* — Armstrong Teasdale LLP (57) ABSTRACT

Integrated solar modules are provided. In one example, a corner cap for coupling to a solar module is described. The solar module has a solar panel and a frame circumscribing the solar panel. The corner cap includes a first wall and a second wall. The first wall and the second wall define a corner angle substantially the same as an angle defined by a corner of the solar module. The corner cap includes a flange extending from the corner cap. The flange is configured for coupling the corner cap to a solar module.

18 Claims, 10 Drawing Sheets

INTEGRATED SOLAR MODULE

FIELD

This disclosure generally relates to integrated solar modules and, more specifically, to corner caps for mounting, grounding, and/or edge protection for solar modules.

BACKGROUND

Solar modules are devices which convert solar energy into other forms of useful energy (e.g., electricity or thermal energy). Such modules are typically positioned above an underlying support surface by a rack. This rack may be configured to position the solar module at an angle relative to the support surface to minimize an angle of incidence between the solar module and the sun's rays. Minimizing this angle of incidence increases the amount of solar energy gathered by the solar module.

Racks are typically formed from a plurality of structural members. These members may be assembled into a rack at a factory or other remote site and then transported to an installation location in this assembled state. In other methods, the structural members are transported to an installation location and then assembled to form the racks on site.

Regardless of whether a rack is assembled at a remote location or at a site of installation, solar modules are commonly transported to the installation site and mounted to the rack at the installation site. During transport and installation, solar modules, which commonly include one or more sheets of glass, are susceptible to damage.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

One aspect of the present disclosure is a solar module including a solar panel, a frame, and a corner cap. The solar panel includes a top surface, a bottom surface, and a plurality of edges extending between the top surface and the bottom surface. The edges of the solar panel define at least one corner having a first side and a second side. The first side and the second side define a corner angle therebetween. The frame is coupled to the edges of the solar panel and circumscribes the solar panel. The frame includes an inner surface adjacent the solar panel and an outer surface substantially parallel with and spaced from the inner surface. The frame includes a channel positioned adjacent at least one of the first and second sides of the at least one corner. The channel extends from the outer surface of the frame toward the inner surface. The corner cap is coupled to the outer surface of the frame about the first and second side of the at least one corner. The corner cap includes a first wall, a second wall, and a flange. The first wall extends in a plane substantially parallel to at least one of the plurality of edges. The second wall extends in a plane substantially parallel to at least one of the plurality of edges. The first wall and the second wall define an angle substantially equal to the corner angle. The flange extends generally perpendicularly from one of the first wall and the second wall and extends into the channel.

Another aspect of the present disclosure is a corner cap for coupling to a solar module. The solar module has a solar panel and a frame circumscribing the solar panel. The corner cap includes a first wall and a second wall. The first wall and the second wall define a corner angle substantially the same as an angle defined by a corner of the solar module. The corner cap includes a flange extending from the corner cap. The flange is configured for coupling the corner cap to a solar module.

Yet another aspect of the present disclosure is a method including coupling a plurality of corner caps to a plurality of corners of a solar module having a solar panel and a frame circumscribing the solar panel. The method includes positioning the solar module between a first mounting rail and a second mounting rail, and coupling a first of the plurality of corner caps to the first mounting rail with a grounding clip fastened to the first mounting rail.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

The embodiments described herein generally relate to integrated solar modules. More specifically embodiments described herein relate to corner modules for mounting, grounding, and/or edge protection for solar modules.

Figure 1:
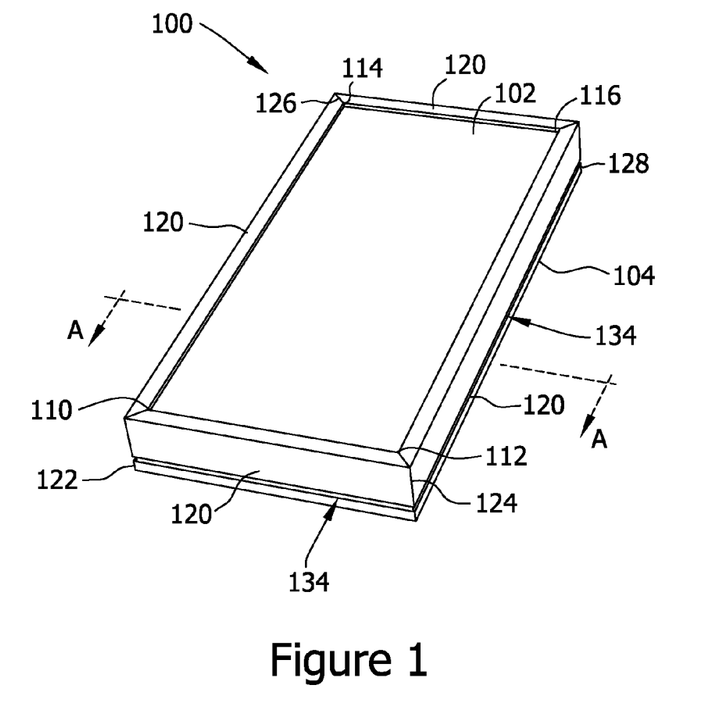
FIG. 1 is a perspective view of an example solar module.
Figure 2:
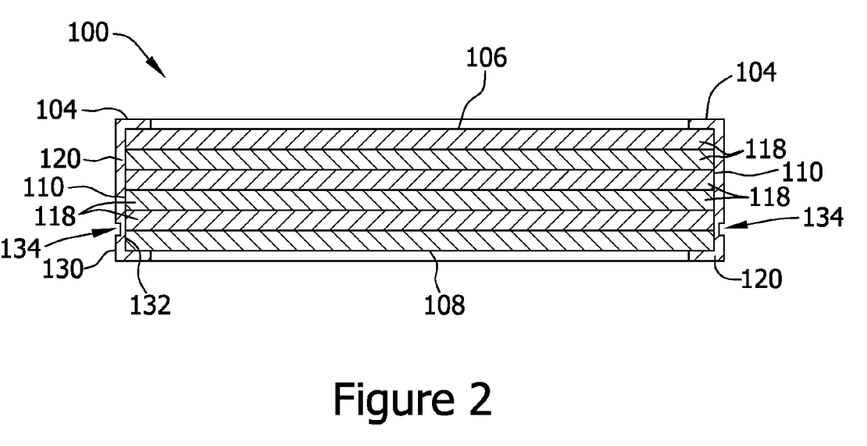
FIG. 2 is a cross-sectional view of the solar module shown in FIG. 1 taken along the line A-A.

Referring initially to FIGS. 1 and 2, a solar module is indicated generally at 100. A perspective view of solar panel 100 is shown in FIG. 1. FIG. 2 is a cross sectional view of solar panel 100 taken at line A-A shown in FIG. 1. Solar module 100 includes a solar panel 102 and a frame 104 circumscribing solar panel 102.

Solar panel 102 includes a top surface 106 and a bottom surface 108 (shown in FIG. 2). Edges 110 extend between top surface 106 and bottom surface 108. In the exemplary embodiment, solar panel 102 is rectangular shaped. In other embodiments, solar panel 102 may have any suitable shape including, for example, square, pentagonal, hexagonal, etc. In the exemplary embodiment, solar panel 102 defines four corners 110, 112, 114, and 116.

As shown in FIG. 2, the exemplary solar panel 102 has a laminate structure that includes several layers 118. Layers 118 may include for example glass layers, non-reflective layers, electrical connection layers, n-type silicon layers, p-type silicon layers, and/or backing layers. In other embodiments, solar panel 102 may have more or fewer, including one, layers 118, may have different layers 118, and/or may have different types of layers 118.

As shown in FIG. 1, frame 104 circumscribes solar panel 102. Frame 104 is coupled to solar panel 102, as best seen in FIG. 2. Frame 104 assists in protecting edges 110 of solar panel 102. In the exemplary embodiment, frame 104 is constructed of four frame members 120. In other embodiments frame 104 may include more or fewer frame members 120. In the exemplary embodiment, frame 104 defines four corners 122, 124, 126, and 128, which may also be referred to as the corners of solar module 100. Each corner 122, 124, 126, and 128 is adjacent and corresponds to one corner 110, 112, 114, and 116 of solar panel 102. Corners 122, 124, 126, and 128 each define an angle that is substantially the same as the angle of the corner 110, 112, 114, and 116 of solar panel 102 to which it corresponds. In the example embodiment the angle is ninety degrees. In other embodiments, the angle may any angle suitable for positioning adjacent a corner of solar panel 102.

Exemplary frame 104 includes a outer surface 130 spaced apart from solar panel 102 and an inner surface 132 adjacent solar panel 102. Outer surface 130 is spaced apart from and substantially parallel with inner surface 132. In the exemplary embodiment, frame 104 is made of aluminum. More particularly, in some embodiments frame 104 is made of 6000 series anodized aluminum. In other embodiments, frame 104 may be made of any other suitable material providing sufficient rigidity including, for example, rolled or stamped stainless steel, plastic or carbon fiber.

Frame 104 includes a channel 134 extending from outer surface 130 of frame 104 toward inner surface 132. In the exemplary embodiment, channel 134 is a single channel that extends substantially continuously around the entire perimeter of frame 104. In other embodiments, channel 134 may be discontinuous and/or may comprise a plurality of channels. Channel 134 is located adjacent both sides of each corner 122, 124, 126, and 128. In other embodiments, channel 134 may be located adjacent a single side of each corner 122, 124, 126, and 128. Channel 134 is generally configured at least for assisting in coupling a corner cap (described below) to frame 104.

Figure 3:
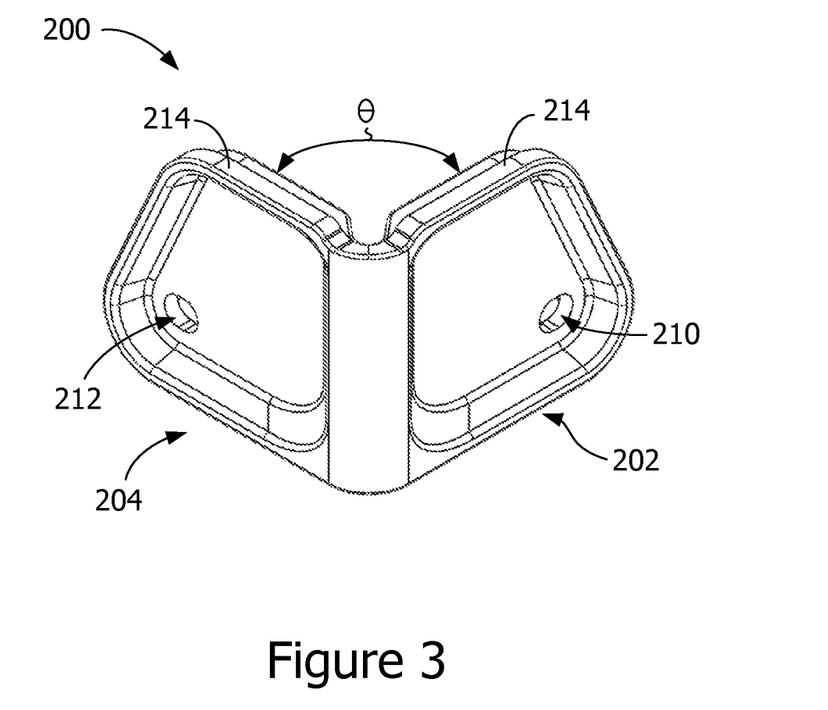
FIG. 3 is a top, outer perspective view of an example corner cap for use with the solar module shown in FIG. 1.
Figure 4:
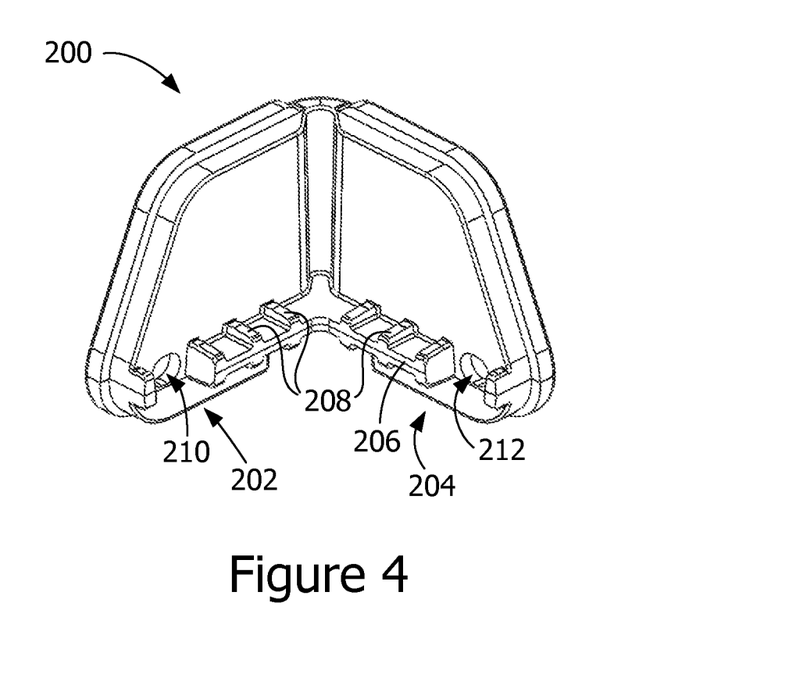
FIG. 4 is top, inner perspective view of the corner cap shown in FIG. 3.
Figure 5:
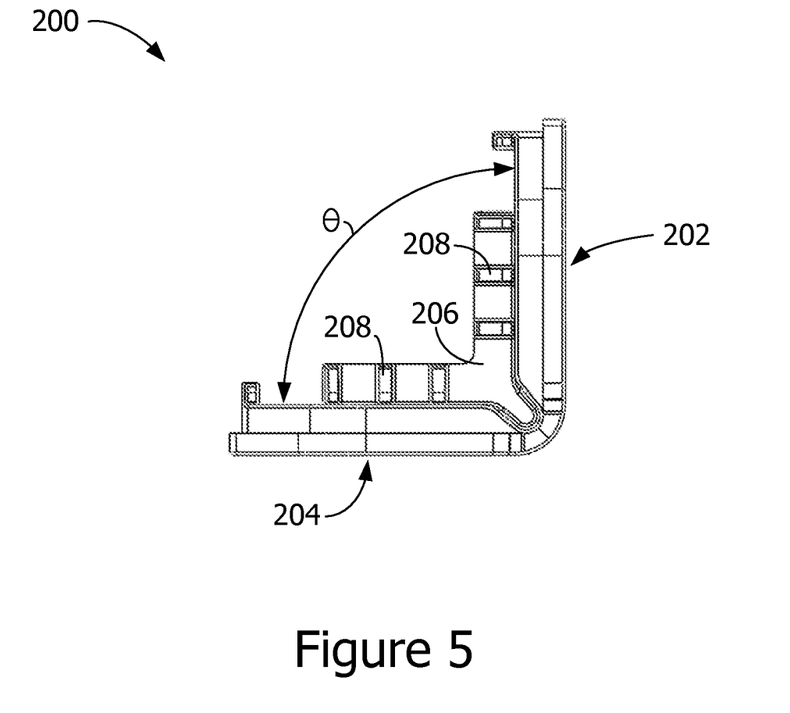
FIG. 5 is a plan view of the corner cap shown in FIG. 3.
Figure 6:
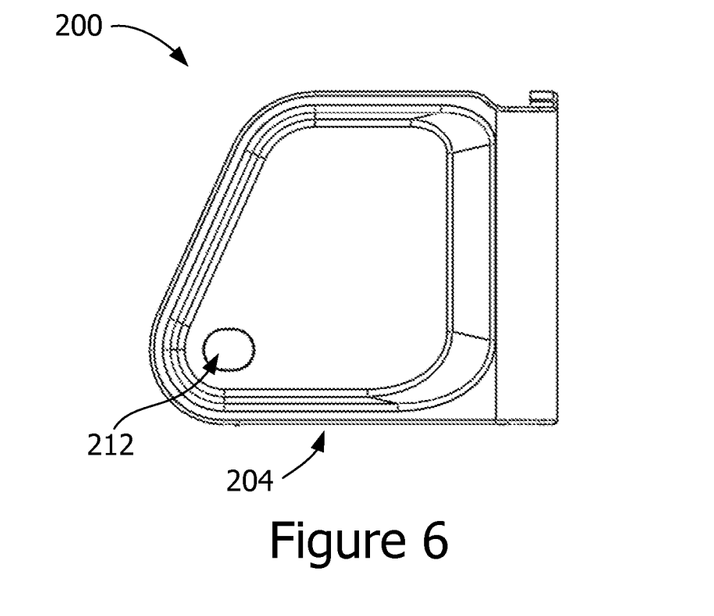
FIG. 6 is an elevation view of the corner cap shown in FIG. 3.

Referring now to FIGS. 3-6, a corner cap is indicated generally at 200. FIG. 3 is a perspective view of an outside of corner cap 200, while FIG. 4 is a perspective view of an inside of corner cap 200. FIG. 5 is a top view of corner cap 200, and FIG. 6 is an elevation view of corner cap 200.

Corner cap 200 includes a first wall 202 and a second wall 204. First wall 202 and second wall 204 define an angle θ. In the exemplary embodiment, angle θ is about ninety degrees. In other embodiments angle θ may be any angle suitable for fitting corner cap 100 to a corner of a solar module.

Corner cap 200 includes a flange 206 extending substantially perpendicular from first and second walls 202 and 204 of corner cap 200. In the exemplary embodiment, flange 206 extends around both of first and second walls 202 and 204. In other embodiments, flange 206 may be divided into multiple flanges 206 and/or may extend along only one of first and second walls 202 and 204.

Flange 206 is configured for coupling corner cap 200 to solar module 100. More specifically, flange 206 is configured for coupling corner cap 200 to frame 104 of solar module 100. In particular, flange 206 is configured (e.g., sized, shaped, etc.) for mating engagement with channel 134 in frame 104. In the exemplary embodiment, flange 206 includes a plurality of projecting teeth 208. Other embodiments may include more or fewer teeth 208, including no teeth 208. In the exemplary embodiment, teeth 208 extend substantially perpendicularly from flange 206. Teeth 208 facilitate creation of an interference fit between flange 206 and channel 134.

In the exemplary embodiment, corner cap 200 includes two apertures 210 and 212. Aperture 210 extends through first wall 202 and aperture 212 extends through second wall 204. Apertures 210 and 212 are configured for receiving a fastener (not shown in FIGS. 3-6). In the exemplary embodiment, a fastener (e.g., a screw, bolt, etc.) extends through each aperture 210 and 212 to frame 104 to further couple corner cap 200 to frame 104 and solar module 100. In other embodiments, fasteners and/or apertures 210 and 212 may be omitted and corner cap 200 may be coupled to frame 104 by other means or solely by interference fit between flange 206 and channel 134.

Corner cap 200 includes ridges 214 extending substantially parallel from the top of first and second walls 202 and 204 of corner cap 200. In the exemplary embodiment, corner cap 200 includes two ridges 214, one on each of first and second walls 202 and 204. In other embodiments, a single ridge may extend from first and second walls 202 and 204, or more than one ridge may extend from each of first and second walls 202 and 204.

Corner cap 200 may be constructed of any suitable material for the purposes described herein including for example, protecting corners 122, 124, 126, and 128 of solar module 100. In the exemplary embodiment, corner cap 200 is constructed of an electrically conductive material. In particular, corner cap 200 is made of aluminum. In other embodiments, corner cap 200 may be made of any other electrically conductive material including for example, other metals, conductive plastics, etc.

In the exemplary embodiment, corner cap 200 is monolithically formed. More particularly, corner cap 200 is die cast. In other embodiments, corner cap 200 may be formed by any other suitable process including, for example by stamping or machining. Further, in some embodiments, corner cap 200 may be formed from separate material that are joined together to form corner cap 200, such as by welding.

Figure 7:
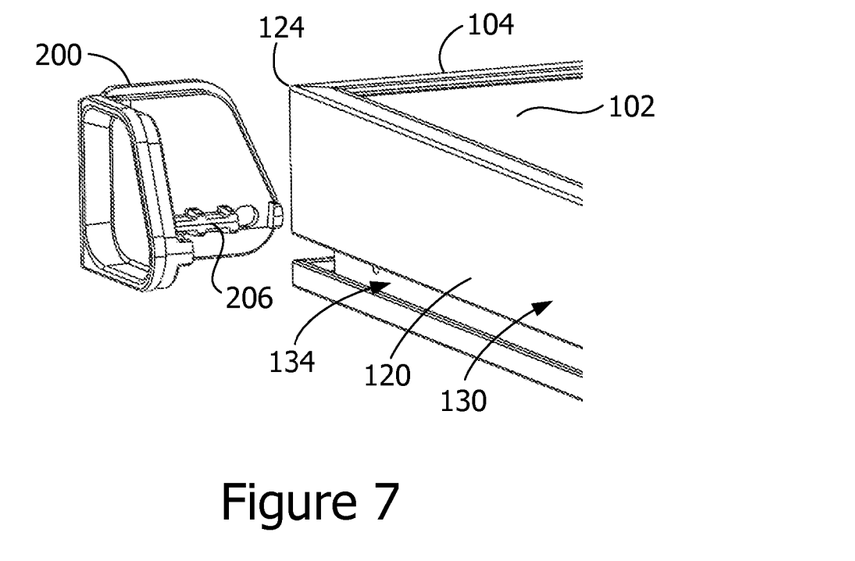
FIG. 7 is an exploded view of the corner cap shown in FIG. 3 and the solar module shown in FIG. 1.
Figure 8:
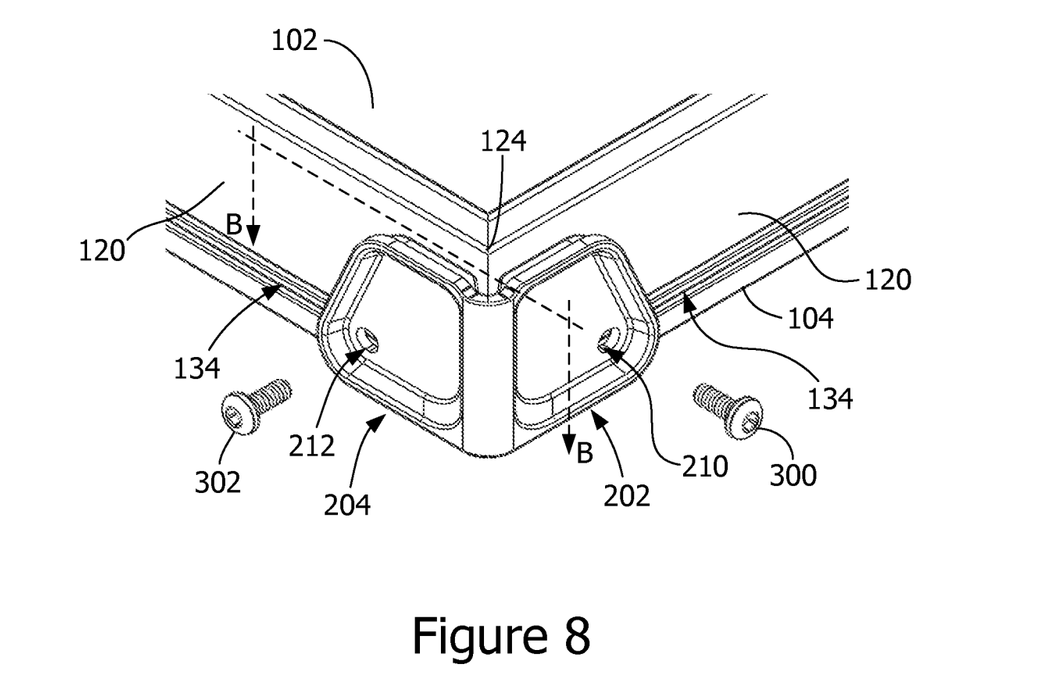
FIG. 8 is a perspective view of the corner cap shown in FIG. 3 coupled to the solar module shown in FIG. 1.
Figure 9:
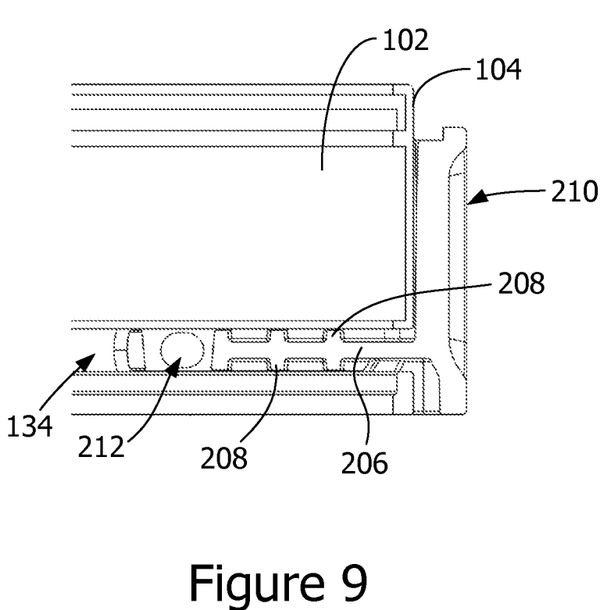
FIG. 9 is a cross sectional view of the corner cap and solar module shown in FIG. 8 taken along the line B-B.

Turning now to FIGS. 7-9, attachment of corner cap 200 to frame 104 will be described. FIG. 7 illustrates positioning of corner cap 200 adjacent corner 124 of solar module 100 before coupling corner cap 200 to corner 124. FIG. 8 illustrates corner cap 200 coupled to frame 104 at corner 124 by an interference fit. FIG. 9 is a cross-sectional view along B-B in FIG. 8 showing corner cap 200 coupled to frame 104 and flange 206 positioned within channel 134.

To install corner cap 200 on solar module 100, corner cap 200 is positioned adjacent a corner, such as corner 124 in FIG. 7. Corner cap 200 is forced against outer edge 130 of frame 104 to engage flange 206 within channel 134. Flange 206, and particularly teeth 208, forms an interference fit with frame 104, thereby holding corner cap in position against frame 104 and surrounding corner 124, as shown in FIG. 9. Fasteners 300 and 302, shown in FIG. 8, are inserted through apertures 210 and 212, respectively, and into channel 134. Fasteners 300 and 302 further couple corner cap 200 to frame 104 of solar module 100. In the exemplary embodiment, fasteners 300 and 302 are self-tapping screws that screw into frame 104. In other embodiments fasteners 300 and 302 may be another type of screw, bolt, or other suitable fastener.

The process of mounting corner cap 200 to solar module 100 is repeated, using separate corner caps 200, for each corner 122, 124, 126, and 128 of solar module 100. In the preferred embodiment, corner caps 200 are installed on all corners of solar module 102 at a location remote from the installation site. In other embodiments, corner caps 200 may be coupled to solar module 100 at the installation site.

Figure 10:
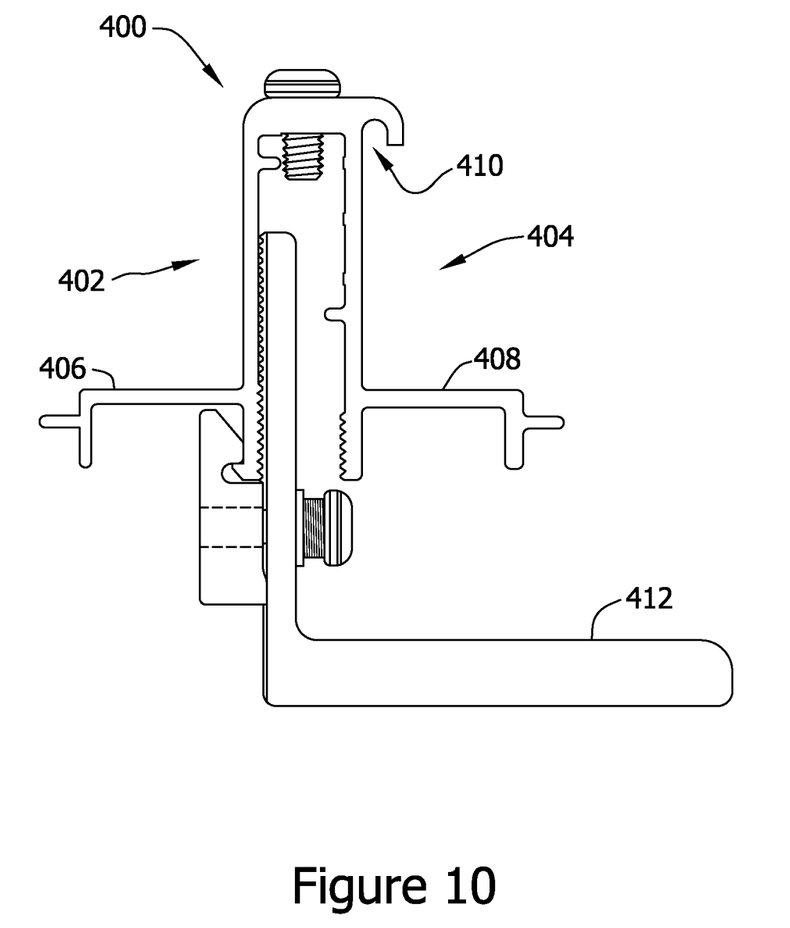
FIG. 10 is a profile of an example rail for mounting the solar module shown in FIG. 3.
Figure 11:
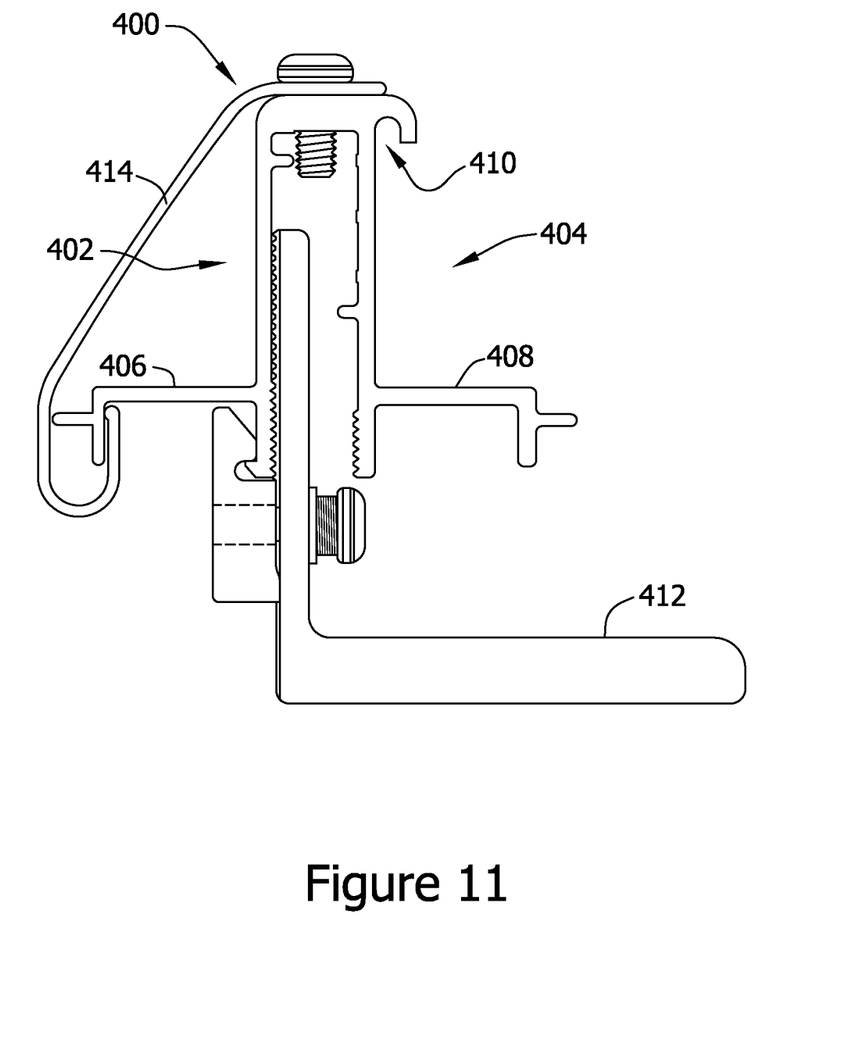
FIG. 11 is a profile of the example rail shown in FIG. 10 including a cosmetic cap.

In addition to protecting corners 122, 124, 126, and 128 of solar module 100, corner caps 200 are used, in the exemplary embodiment to mount solar module 100 to a support structure or rack. Profile views of an example support rail 400 are shown in FIGS. 10 and 11. Rail 400 can support one or more modules on each side 402 and 404. Rail 400 includes a first ledge 406 and a second ledge 408. Rail 400 includes an inverted channel 410 above second ledge 408 and does not include such an inverted channel above first ledge 406. Inverted channel 410 is configured for mating engagement with ridges 214. In other embodiments, inverted channel 410 may have any shape suitable for engagement with ridges 214. In the exemplary embodiment, rail 400 is mounted to a support bracket 412. Support bracket 412 will typically be mounted to the structure on which solar modules 100 are to be mounted. In other embodiments, support bracket 412 may have any suitable shape for mounting rail 400. In some embodiments, rail 400 may be mounted directly to a structure without a support bracket 412. As shown in FIG. 11, if modules will not be supported on both sides 402 and 404 of rail 400, such as on an outside edge of an array of solar modules 100, a cosmetic cover 414 may be attached to rail 400 to cover the unused side 402 or 404.

Figure 12:
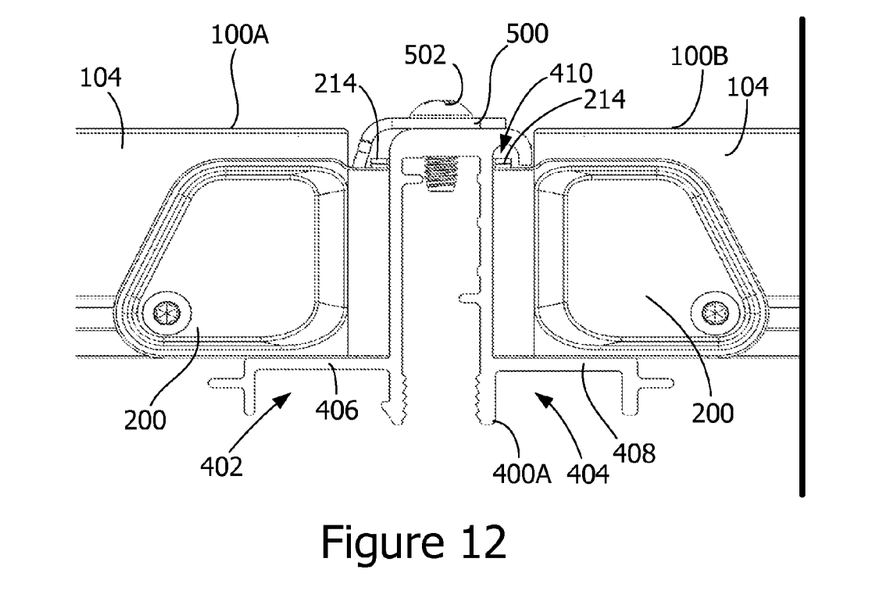
FIG. 12 is an elevation view of the rail shown in FIG. 10 with two solar modules as shown in FIG. 1 mounted thereon.
Figure 15:
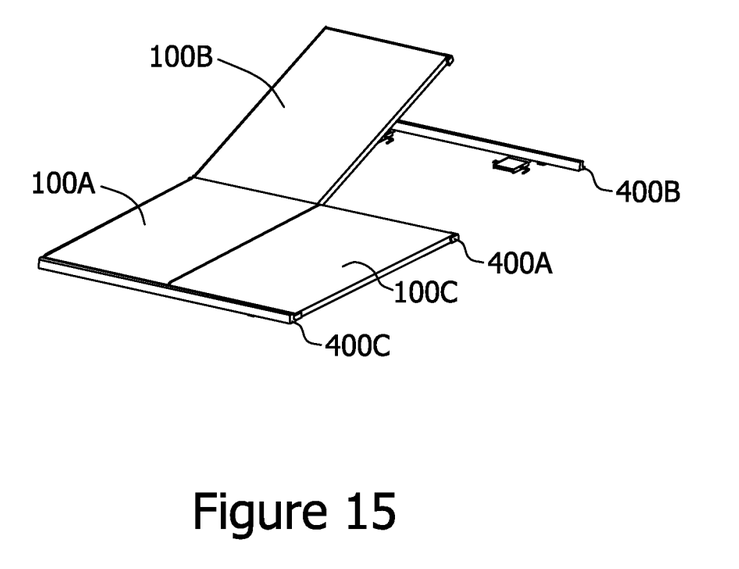

Turning now to FIGS. 12-16, assembly of a two-by-two solar installation including four solar modules 100 (referred to individually as 100A, 100B, 100C, and 100D) with corner caps 200 to three rails 400 (referred to individually as rails 400A, 400B, and 400C) will be described. FIG. 12 illustrates rail 400A with two solar modules 100A and 100B mounted to rail 400A. On the second side 404 of rail 400A, solar module 100B rests on ledge 408. Ridge 214 on corner module 200 of solar module 100B is captured within inverted channel 410 of rail 400. Solar module 100B is positioned thus by tilting solar module 102B (as shown in FIG. 15) at an angle sufficient to allow ridge 214 to be inserted under inverted channel 410. Solar module 100B is then lowered until the opposite end of solar module 100B is positioned on rail 400B. The side of solar module 100B is coupled to rail 400B in the same manner as will be described for connection of solar module 100A to rail 400A.

Solar module 100A couples to rail 400C (shown in FIG. 14) in the same manner described above with respect to coupling module 100B to rail 400A. When lowered to rest on rail 400A, solar module 100A rests on ledge 406 of rail 400A, as shown in FIG. 12. As described above, rail 400A does not include an inverted channel above ledge 406.

Figure 13:
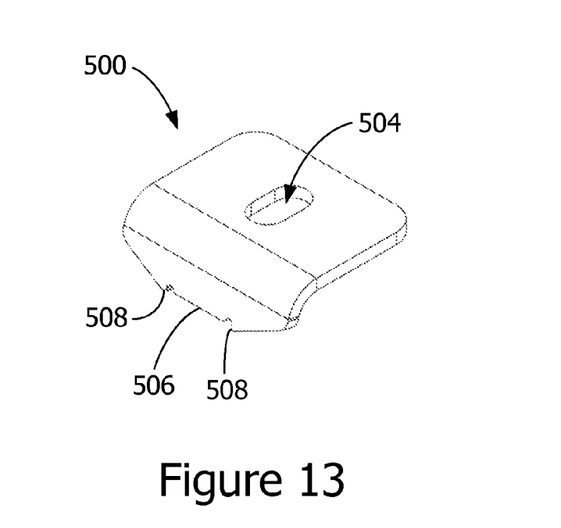
FIG. 13 is an example grounding clip for use with the installation shown in FIG. 12.

A grounding clip 500 is used to retain solar module 100A to rail 400A. Grounding clip 500 is connected to rail 400A using a fastener 502. As shown in FIG. 13, grounding clip 500 includes an aperture 504. Fastener 502 passes through aperture 504 and into rail 400A. By tightening fastener 502, grounding clip 500 is pulled toward rail 400A. Tip 506 of grounding clip 500 applies a downward force to corner cap 200 of solar module 100A to hold corner cap 200 against ledge 406 and to capture ridge 214. Grounding clip 500 includes teeth 508. When fastener 502 is tightened against rail 400A, teeth 508 engage into corner cap 200 to further facilitate preventing movement of corner cap 200 and solar module 100A. In the exemplary embodiment, grounding clip 500 is fabricated from a conductive material. More specifically grounding clip is fabricated from stainless steel. In other embodiments, grounding clip 500 may be fabricated from any other suitable conductive material. In the exemplary embodiment, grounding clip 500 is manufactured by stamping. In other embodiments, clip 500 may be made by molding, machining, etc.

In addition to providing mechanical coupling of solar module 100A, via corner cap 200, to rail 400A, ground clip 500 also provides a galvanic connection between rail 400A and corner cap 200. Thus, grounding clip 500 grounds corner cap 200 to rail 400A. In some embodiments, solar modules 100 are grounded to corner caps 200. In such embodiments, grounding clips 500 provide a ground connection for solar modules 100, via corner caps 200, to rails 400.

Figure 14:
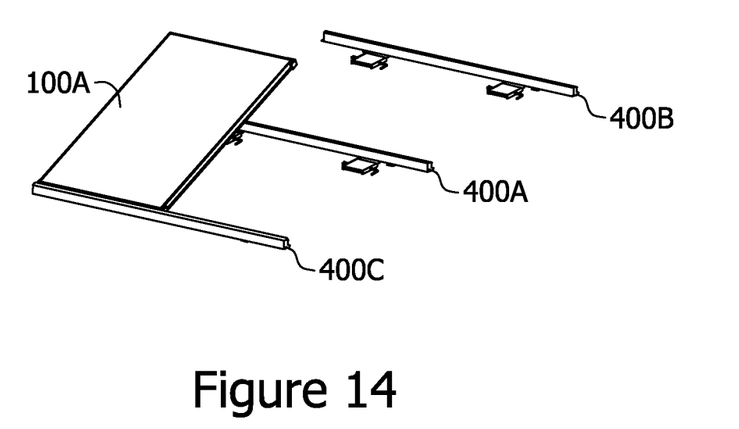
FIGS. 14, 15, and 16 illustrate assembly of an example solar installation including rails as shown in FIG. 10, solar modules as shown in FIG. 1, corner caps as shown in FIG. 3, and grounding clips as shown in FIG. 12.
Figure 16:
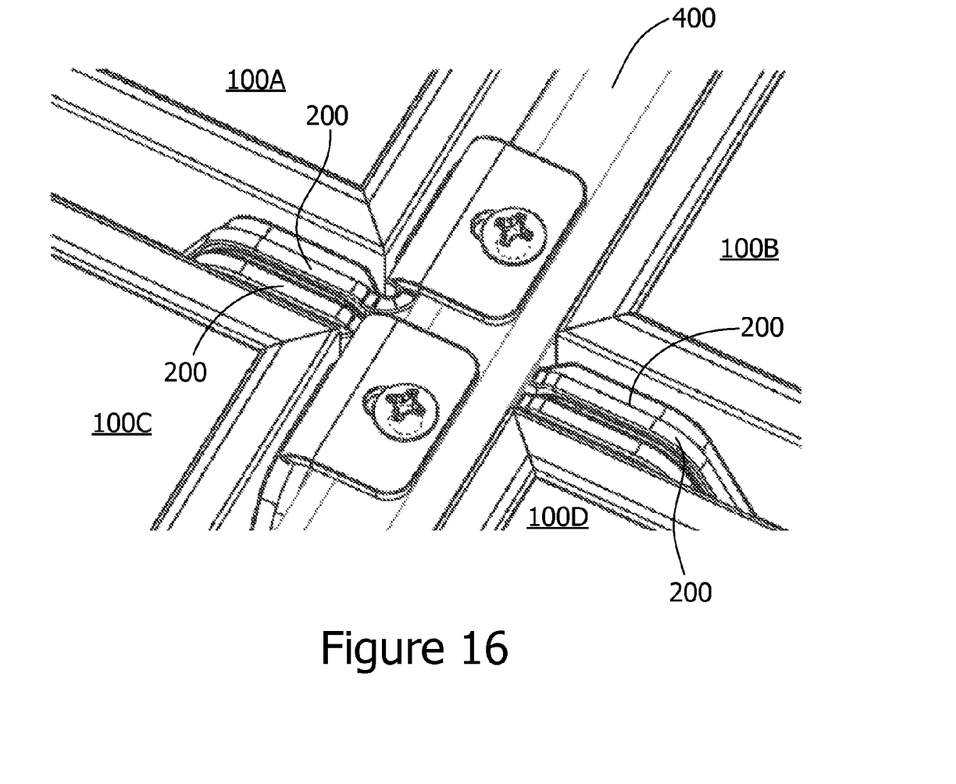

The process described above is repeated for each solar module 100 until all four solar modules 100 are mounted to rails 400. In FIG. 16, a partial perspective view of the center of the installation of FIGS. 14 and 15 is shown.

Because corner caps 200 are symmetrical, the orientation of solar modules 100 with respect to rails 400 may be varied without need to change or alter corner caps 200. Although the position of rails 400 may need to be changed, solar modules 100 may be coupled to rails 400 in a first orientation, for example as shown in FIGS. 14 and 15, or rotated ninety, one hundred eighty, or two hundred seventy degrees. In any of these orientations, corner caps 200 will couple with rails 400 in the same manner described above.

Methods and systems including integrated solar modules with corner caps as described herein, may achieve superior results to some known methods and systems. For example, corner caps may be mounted on solar modules at a remote location and may reduce the amount of assembly needed, the time of assembly, and/or the number of fasteners utilized at an installation site. Furthermore, the above-described corner caps provide protection for the corners of solar modules during transportation, assembly and use. Moreover, the corner caps also integrate mounting for the solar module with corner protection and grounding to a mounting structure. Solar modules with the described corner caps may be easier, faster, and or safer to install than solar module utilizing some known systems. The symmetrical configuration of the corner caps also permits installation in multiple orientations without needing to change or adjust the corner caps.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A solar module comprising:
a solar panel comprising a top surface, a bottom surface, and a first edge and a second edge extending between the top surface and the bottom surface, the first and second edges of the solar panel defining a first side and a second side of a corner;
a frame coupled to the first and second edges of the solar panel and circumscribing the solar panel, the frame comprising:
an inner surface adjacent at least one of the first edge and second edge of the solar panel
an outermost surface substantially parallel with and spaced from the inner surface; and
a channel adjacent at least one of the first and second sides of the corner, the channel extending inward through the outermost surface of the frame toward the inner surface; and
a corner cap coupled to the outermost surface of the frame adjacent the corner, the corner cap configured for at least one of protecting the corner and mounting the solar module to a mounting rail.

2. A solar module in accordance with claim 1, wherein the corner cap comprises:
a first wall, the first wall extending in a plane substantially parallel to one of the first and second edges;
a second wall, the second wall extending in a plane substantially parallel to one of the first and second edges, the first wall and the second wall defining an angle substantially the same as the corner angle; and
a flange extending generally perpendicular from one of the first wall and the second wall, the flange coupled within the channel by an interference fit to couple the corner cap to the frame.

3. A solar module in accordance with claim 1, wherein the corner cap is monolithically formed.

4. A solar module in accordance with claim 1, wherein the corner cap is formed of an electrically conductive material.

5. A solar module in accordance with claim 2, wherein the channel extends around the first and second sides of the corner.

6. A solar module in accordance with claim 5, wherein the flange extends into the channel on the first and second sides of the corner.

7. A solar module in accordance with claim 1, wherein the corner cap comprises an aperture configured to receive a fastener, and the solar module further comprises a fastener extending through the aperture to the frame.

8. A solar module in accordance with claim 1, wherein the corner cap extends from about a bottom of the frame adjacent the bottom surface of the solar panel to a position below a top of the frame adjacent the top surface of the solar panel.

9. A solar module in accordance with claim 1, wherein the solar panel comprises a plurality of edges extending between the top surface and the bottom surface, the plurality of edges of the solar panel defining a plurality of corners, the solar module comprises a plurality of corner caps, and wherein each one of the plurality of corner caps is coupled to the frame adjacent a different one of the plurality of corners.

10. A corner cap for coupling to a solar module having a solar panel and a frame circumscribing the solar panel, the solar panel including a top surface, a bottom surface, and a plurality of edges extending between the top and bottom surfaces, the frame having an inner surface adjacent the plurality of edges of the solar panel, an outermost surface spaced from the inner surface, and a channel extending inward through the outermost surface of the frame toward the inner surface, the plurality of edges of defining a plurality of corners of the solar module, the corner cap comprising:
a first wall;
a second wall, the first wall and the second wall defining a corner angle substantially the same as an angle defined by one of the plurality of corners of the solar module; and
a flange extending from at least one of the first and second walls, the flange configured for retention in the channel of the frame to couple the corner cap to the outermost surface of the frame of the solar module adjacent one of the plurality of corners.

11. A corner cap in accordance with claim 10, wherein the flange is configured for coupling the corner cap to a solar module via interference fit.

12. A corner cap in accordance with claim 10, further comprising an aperture for receiving a fastener for coupling the corner cap to a solar module.

13. A corner cap in accordance with claim 10, wherein the corner cap is monolithically formed.

14. A corner cap in accordance with claim 13, wherein the corner cap is monolithically formed of a conductive material.

15. A corner cap in accordance with claim 14, wherein the conductive material comprises a metal.

16. A corner cap in accordance with claim 10, further comprising a ridge extending away from at least one of the first wall and the second wall, the ridge extending substantially in a same plane as the first or second wall, the ridge configured for mating engagement with a solar module mounting rail.

17. A corner cap in accordance with claim 10, wherein the flange extends along the first wall and the second wall.

18. A corner cap in accordance with claim 10, wherein the flange comprises a plurality of teeth extending generally perpendicular from the flange.

* * * * *